United States Patent
Figueroa

(10) Patent No.: US 7,659,529 B2
(45) Date of Patent: Feb. 9, 2010

(54) METHOD AND APPARATUS FOR VIBRATION REDUCTION IN LASER SYSTEM LINE NARROWING UNIT WAVELENGTH SELECTION OPTICAL ELEMENT

(75) Inventor: Efrain Figueroa, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 204 days.

(21) Appl. No.: 12/002,939

(22) Filed: Dec. 18, 2007

(65) Prior Publication Data
US 2008/0251738 A1    Oct. 16, 2008

Related U.S. Application Data

(60) Provisional application No. 60/923,486, filed on Apr. 13, 2007.

(51) Int. Cl.
   *H01J 35/20* (2006.01)
(52) U.S. Cl. ................ 250/504 R; 378/119
(58) Field of Classification Search ........... 250/504 R; 378/119
   See application file for complete search history.

(56) References Cited

U.S. PATENT DOCUMENTS

| | | | |
|---|---|---|---|
| 4,634,081 A | 1/1987 | Chee | 244/54 |
| 5,310,025 A | 5/1994 | Anderson | 188/73.37 |
| 6,298,963 B1 | 10/2001 | Kim | 188/379 |
| 6,598,545 B2 | 7/2003 | Ryaboy et al. | 108/136 |
| 6,948,744 B2 | 9/2005 | Atansoski et al. | 285/226 |
| 7,110,504 B2 * | 9/2006 | Kasumi | 378/119 |

OTHER PUBLICATIONS

KnitMesh Technologies; http://www.knitmeshtechnologies.com/automotive; http://www.knitmeshtechnologies.com/specials.html; www.knitmeshtechnologies.com/filters.html. Nov. 20, 2007.
Barry Controls; http://www.barrycontrols.com/defenseandindustrial/productselectionguide/metlflex/html.; Nov. 21, 2007.

* cited by examiner

*Primary Examiner*—Kiet T Nguyen

(57) ABSTRACT

A method and apparatus is disclosed that may comprise an ultraviolet light source; an optical element within an optical path of the light source mounted on an optical element mount; a vibration damping mechanism operatively connected to the optical element or to the mount which may comprise a wire mesh pad. The optical element may comprise a center wavelength selection optical element, which may comprise a grating, a mirror, or a prism. The vibration damping mechanism may comprise the wire mesh pad comprising an elastic interface between a driving mechanism lever arm operable to move the optical element or the mount and a driving lever arm actuator. The vibration damping mechanism may comprise a mass damping mechanism comprising a mounting plate connected to the optical element or to the mount; a damping mass; the wire mesh pad comprising an elastic interface between the mounting plate and the damping mass.

24 Claims, 11 Drawing Sheets

Frosted Surfaces are indicated by a red line

METHOD AND APPARATUS FOR VIBRATION REDUCTION IN LASER SYSTEM LINE NARROWING UNIT WAVELENGTH SELECTION OPTICAL ELEMENT

CROSS-REFERENCE TO RELATED APPLICATIONS

The present application is related to pending U.S. Patent Applications Ser. No. 60/923,486, filed on Apr. 13, 2007, entitled TWO STAGE EXCIMER LASER WITH SYSTEM FOR BANDWIDTH CONTROL, and Ser. No. 11/510,037, filed on Aug. 25, 2006, entitled ACTIVE SPECTRAL CONTROL OF DUV LIGHT SOURCE, and Ser. No. 11/472,088, filed on Jun. 21, 2006, entitled BANDWIDTH CONTROL DEVICE, and Ser. No. 11/254,282, filed on Oct. 20, 2005, entitled METHOD AND APPARATUS FOR GAS DISCHARGE LASER BANDWIDTH AND CENTER WAVELENGTH CONTROL, and Ser. No. 11/173,988, filed on Jun. 30, 2005, entitled ACTIVE BANDWIDTH CONTROL FOR A LASER, and Ser. No. 11/173,955, filed on Jun. 30, 2005, entitled, GAS DISCHARGE LASER LINE NARROWING MODULE, the disclosures of each of which are hereby incorporated by reference.

FIELD

The present invention is related to DUV laser line narrowing modules ("LNMs") having center wavelength selection optical elements, e.g., reflective optical elements, e.g., gratings or mirrors and/or transmissive optical elements, e.g., prisms, for center wavelength selection by, e.g., changing an angle of incidence of a beam of light pulses onto a dispersive center wavelength selection optical element such as a grating and optical element mounts which are either movable or have some flexure in the mounting, or both.

BACKGROUND

Applicant's employer has identified mechanical resonances occurring in what is referred to in the art as a line narrowing module ("LNM") or line narrowing package ("LNP"). Such an LNM may contain, e.g., a dispersive wavelength selective optical element, e.g., as is contained in single chamber laser systems, e.g., Nanolith 7000 laser systems sold by applicant's employer and assignee Cymer, Inc. and/or two chamber laser systems such as master-oscillator/power amplifier ("MOPA" laser systems such as the XLA-XXX series of MOPA laser systems, e.g., beginning with the XLA-100, introduced in about 2003. Recently applicant's assignee has introduced a version of the multi-chambered laser systems utilizing a power ring amplifier ("PRA") for the amplifier portion, i.e., a "MOPRA".

The dispersive wavelength selective optic of choice has been a blazed eschelle grating in a Littrow configuration, with center wavelength being selected by changing the angle of incidence of light emitting from the lasing chamber upon the grating. The grating acts as the fully reflective rear mirror of the lasing cavity of the MO or the single chamber laser system and along with, e.g., the use of an aperture selects the center wavelength of the laser system output and incidentally, depending on such things as the wavefront of the light incident on the grating and in combination with the shape of the grating also selects bandwidth of the laser system output as well.

Recently, for various reasons, applicant's employer has changed from a fully maximum reflective mirror ("$R_{MAX}$") to a series of prisms for changing the angle of incidence of the light on the grating, e.g., for use with a longer grating for better center wavelength and bandwidth control. The series of prisms both increases the magnification of the beam of pulses of light incident on the grating and controls the angle of incidence. The final prism in the series of prisms, e.g., four prisms, in the arrangement selected by applicant's assignee, but could be more or less than four, may be selected to be the one for coarse control of the angle of incidence, e.g., by rotating the prism about a point of pivoting of the prism motion. One or more of the other prisms may also be rotated for fine center wavelength control or the arrangement could also be reversed, so that, e.g., the final prism is for coarse control and the other prism(s) for fine control.

To accomplish the rotary motion, applicant's assignee has adopted a flexured mounting for the final prism in the series, as explained in more detail below. To enable the prism to rotate the flexure mounting also makes the prism susceptible to vibration which can be very detrimental to center wavelength control and/or stability and adversely impact bandwidth control as well.

Damping mechanisms exist to lessen the effect of vibration on the prism positioning, which are typically constructed similarly to vibration isolation mountings, i.e., with an elastomeric material sandwiched between rigid mounting plates, such as made of steel or ceramic, except that only one side of the damping mechanism has a mounting plate and the other typically is formed by a mass that may, e.g., be tuned to a desired range of frequencies of vibration desired to be damped.

At least two problems arise from the use of such damping mechanisms in an LNM of the type referred to herein. First, the elastomeric material, e.g., Viton™ is susceptible to deterioration when exposed to DUV light, which is the type of light being produced by the laser system and of which the center wavelength and bandwidth are being controlled in the LNM, resulting in DUV outside the bandwidth selected by the LNM reflecting inside the LNM and adversely impacting the structural integrity of the elastomeric material. In addition to this structural deterioration, and the impact on damping functionality of the elastomer-containing damper, the material is elastomer susceptible to outgasing which can coat or otherwise damage the optical elements, prisms and grating and/or otherwise adversely impact the optical performance of the LNM, and, e.g., shorten LNM lifetime. Deterioration of the ability to maintain center wavelength and/or bandwidth control within the extremely tight tolerances allowed in modern day utilizations of DUV laser light sources, e.g., integrated circuit photolithography processes, either from limited life of the damping mechanism or deterioration of the functioning of the optical elements or both, causing the need to replace the LNM more often than normally required can have a severe impact on the cost of operation of the laser system over its lifetime, which is detrimental to the effectiveness and/or efficiency of use of the laser system over its lifetime.

A technique to suppress resonances commonly applied by Carl Zeiss SMT is the addition of damped oscillators or mass dampers (so-called "Tilgers"), which may, e.g., consist of mass elements which are connected to the vibrating component via damping pieces of an elastomeric material, e.g., Viton/rubber. A mass, created, e.g. by screw nuts on a 2 mm-thick Viton slab, in accordance with a rough estimate for an appropriate geometry involved desired to be damped, and such things as its mass and resonant frequency(ies), may be, e.g., glued to the side(s) of a flexure mounting where one can expect the largest amplitude of the oscillation to occur, e.g., at the portion that is allowed to flex most with the bending of the flexure mounting.

Applicants propose to resolve the inability of using damping mechanisms containing elastomeric materials in the environment and for the functionality of an LNM according to aspects of embodiments of the disclosed subject matter.

SUMMARY

It will be understood by those skilled in the art that a method and apparatus is disclosed that may comprise an ultraviolet light source; an optical element within an optical path of the light source mounted on an optical element mount; a vibration damping mechanism operatively connected to the optical element or to its mount comprising a wire mesh pad. The optical element may comprise a center wavelength selection optical element, which may comprise a grating, a mirror, or a prism. The vibration damping mechanism may comprise the wire mesh pad comprising a compliant interface inserted between a driving mechanism operable to move the optical element or the mount and a driving mechanism actuator. The vibration damping mechanism may comprise a mass damping mechanism comprising a mounting plate connected to the optical element or to the mount; a damping mass; the wire mesh pad comprising a compliant interface between the mounting plate and the damping mass. The apparatus and method may comprise an ultraviolet light source; a line narrowing module which may comprise: a center wavelength selection optical element within the line narrowing module mounted on an optical element mount; a vibration damping mechanism operatively connected to the optical element or to the mount which may comprise a wire mesh pad. The method and apparatus may comprise a DUV laser light source; a line narrowing module which may comprise a dispersive center wavelength selection optical element within the line narrowing module mounted on a center wavelength selection optical element mount; an angle of incidence selection optical element within the line narrowing module mounted on an angle of incidence selection optical element mount; a vibration damping mechanism operatively connected to the center wavelength selection optical element or to the center wavelength selection optical element mount or to the angle of incidence optical element or to the angle of incidence optical element mount, which may comprise a wire mesh pad. The center wavelength selection optical element may comprise a grating. The angle of incidence selection optical element may comprise a mirror or a prism. The angle of incidence selection optical element mount may comprise a flexure element. The center wavelength selection optical element mount may comprise a flexure element.

DETAILED DESCRIPTION OF THE DISCLOSED SUBJECT MATTER

Figure 1A:
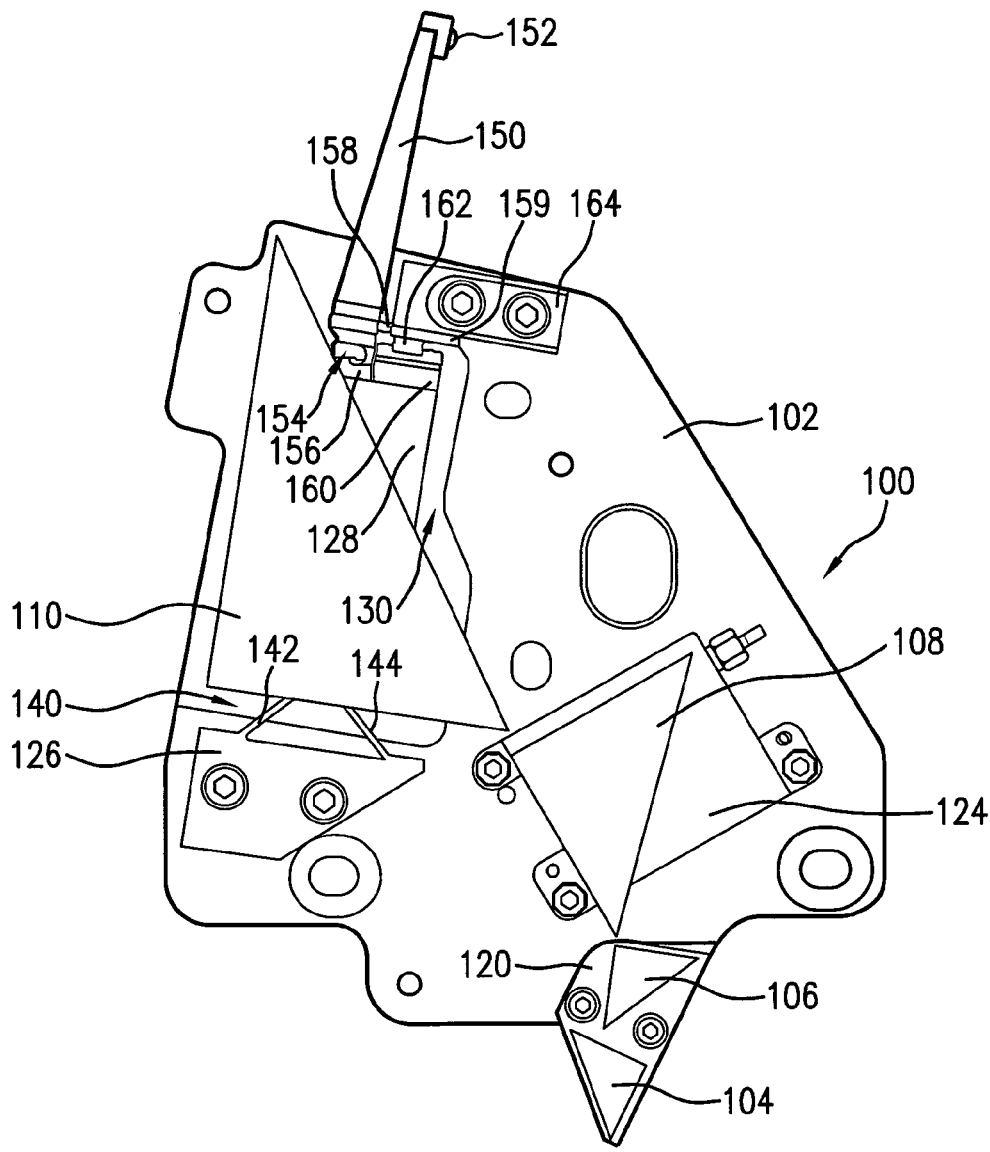
FIG. 1A shows a series of prisms according to aspects of an embodiment of the disclosed subject matter.

According to aspects of an embodiment of the disclosed subject matter applicant proposes to implement damping, e.g., a tuned damping mechanism for both fixed and movable mechanical assemblies, that support optical components, or an actuator damping mechanism for movable optical elements without using elastomeric, polymeric or fluid materials that can be detrimental in DUV light source applications, e.g., because they break down when exposed to stray DUV light and/or outgas and, e.g., contaminate the surface of optics. Applicants propose according to one embodiment to substitute in, e.g., a conventional type of tuned mass damper an all-metal knit wire mesh pad for the conventional damping material (e.g., viscoelastic, polymeric, elastomeric, fluid). Candidate metallic materials may include, e.g., stainless steel, aluminum and copper.

According to aspects of an embodiment of the disclosed subject matter an assembly may be used in which, e.g., a flexible and elastic non-elastomeric material, e.g., a flexible and elastic knit mesh pad, which may be made of a suitable metal or another stiff but drawable material/extrudable material that can be formed into looped filaments and compressed into a pad, similarly to metal wire loops as discussed in more detail below. As used herein elastic is intended to mean flexible and/or compliant, i.e., that the material, e.g., in the form of a wire mesh pad, and/or the pad itself, is elastically deformable, including being compliant and dissipative, e.g., such that a pad that is compliant and dissipative may deform and spring back (be elastic and not permanently deform—beyond whatever permanent deformation may be induced, e.g., in the manufacture of the mesh pad or any pre-formed indentation(s) in the mesh pad, e.g., to receive a lever arm/actuating arm protrusion (e.g., a dimple or nipple)), but also dissipates energy. Elastic as opposed to compliant could be understood to also not be dissipative of energy. Elastic as used herein, however, includes both elastic and compliant, i.e., regardless of whether in deforming the material and/or the pad dissipates energy or not. The knit mesh may be sandwiched between two metal plates, e.g., attached to them via e.g. welding points, solder points to avoid using any non-metal means of attachment such as epoxies. Additional masses can then be attached to one of the metal plates to, e.g., tune the damper to a particular resonance frequency or range of resonant frequencies of interest. The second plate can have a means of attaching the damper assembly to the structure whose vibration is to be mitigated (metal screws, metal pins or the like or welding may be used as an alternative attachment means that avoid the use of adhesives such as epoxy).

The knit wire mesh may be a pad of such material as provided by Knitmesh Technologies of North Wales England and described in their literature, e.g., as seen at www.knitmesh.co.uk as follows:

With its unique structure of interlocking wire loops, knitted mesh offers many advantages over other materials in air and liquid filtration, thermal shock and vibration applications. The knitting process creates a material that when layered or compressed produces a tortuous path which allows highly effective particle capture. Knitted mesh filters can be supplied in any metallic or non-metallic material that can be drawn into a filament and are available in a wide variety of forms including mesh rolls, circular and rectangular pads, rings and compressed elements. Where necessary, metal alloys or plastics can be supplied that are highly resistant to corrosion and can withstand temperatures in excess of 1000° C. Our knitted wire mesh products include vibration control, sound attenuation, sealing technologies for harsh environments, filtration for liquids & gasses and EMC shielding. Compacted wire is also produced for numerous industrial applications—including vibration damping, sound attenuation, heat transfer and performance sealing. Knitted wire cores are produced for high temperature sealing gaskets for furnace, aerospace and marine applications.

Such products can include, as noted on the Knitmesh web-site:

exhaust decoupling rings & knitted mesh sleeves—metal bellows sleeves reduce vibration/noise. Rings absorb thermal expansion in load supports; anti-vibration heat shields to protect from heat from the exhaust system; and catalytic converter knitted mesh wraps to protect delicate ceramic brick from vibration damage.

As used in the present application wire knit mesh pad is intended to include structures of the type made and sold by Knitmesh Technologies in the form of wire knit mesh, metallic or non-metallic, so long as the material is not subject to breakdown under UV radiation and/or harmful outgassing, and in the form of circular or rectangular compressed pads, which may also be rings or rectangular annular shapes, e.g., exhibiting enough flexibility/elasticity due to this construction to be at least slightly compressible and elastic/springy, such that the material can act as a spring for purposes of either serving as an elastic element of a mass damper or a vibration isolation member, as further described below. According to aspects of an embodiment of the disclosed subject matter the material formed for use as a filter, as described in more detail at http://www.knitmeshtechnologies.com/filters.html, whether metal or other suitable material, such as plastic, extrudable into a relatively strong and durable and tough filament, similar to aluminum or steel filament, but still flexible in wire mesh form, e.g., Kevlar, that will not break down when exposed to UV light or detrimentally outgas may be used in the vibration isolation applications discussed in the present application.

Such knit wire mesh, e.g., metallic knit wire mesh has been used in applications for vibration and noise attenuation, e.g., in automotive and aerospace applications, as noted above on the Knitmesh web-site. The general principle is that in the knitting process, wire loops are created which act as tiny springs when subjected to compression/expansion. More importantly, the overlapping loops can offer a mechanism of energy dissipation via inter-wire friction when subject to vibration.

According to aspects of embodiments of the disclosed subject matter, applicant's employer has evaluated stainless steel knit wire mesh, e.g., in the form of circular pads/disks of, e.g., 0.15 mm diameter 304 stainless steel wire, with the pads being ~1 cm in diameter and 3 mm in thickness, though other dimensions are possible, and in the range of 60% to 90% free volume, i.e., 60%. 75%, 85% and 90% free volume. The pads may be thoroughly cleaned and degassed after fabrication. The knit mesh pads may be compressed by the manufacturer into the resultant disks. Such a damping/elastic material does not pose a contamination risk to LNM optics nor break down under DUV radiation exposure. The mesh pads, according to aspects of embodiments of the disclosed subject matter may be used for damping by placing them directly between the lever arm of a drive mechanism and the actuator of the drive mechanism or as tuned damping elements as explained in more detail below.

Figure 1B:
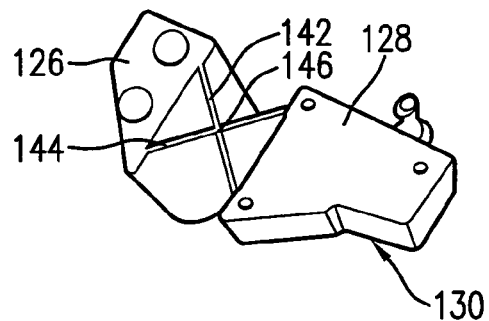
FIG. 1B illustrates an optical element flexured mount according to aspects of an embodiment of the disclosed subject matter.
Figure 1C:
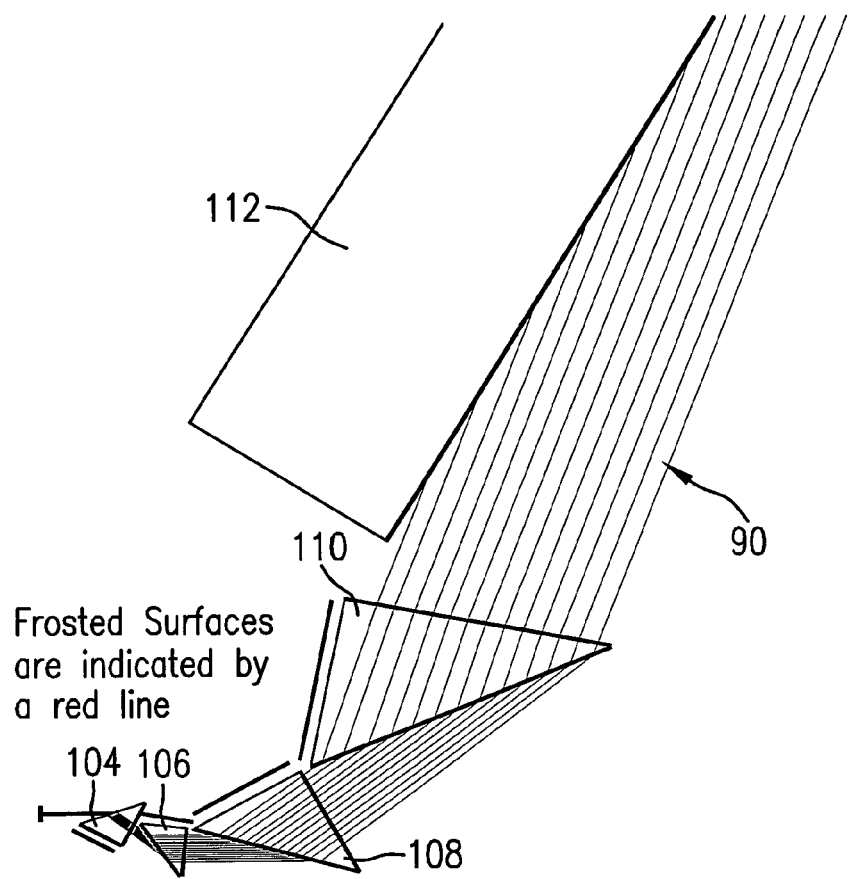
FIG. 1C illustrates schematically a center wavelength selection line narrowing module according to aspects of an embodiment of the disclosed subject matter.

Turning now to FIG. 1 there is shown a line narrowing module prism assembly 100, which may be attached by suitable means, e.g., bolts or screws, to the floor of a line narrowing module housing (not shown). The prism assembly 100 may have a prism assembly mounting plate 102, also suitable for being so attached to the floor of LNM housing. Attached to the prism assembly mounting plate 102 may be a first prism 104, a second prism 106, a third prism 108 and a fourth prism 110. The first and second prisms 104, 106 may be attached intermediately to a first and second prism mounting plate 120. The third prism may be attached to a piezoelectric rotational actuator 124, and the fourth prism 110 may be attached to a fourth prism mounting assembly 124. The fourth prism mounting assembly may include, e.g., a fourth prism mounting assembly base plate 126, which may be attached to the prism assembly mounting plate 102 by suitable means, e.g., the illustrated screws. The fourth prism mounting assembly may also include a fourth prism mounting plate 128, which may have a sidewall 130, and may be attached to the fourth prism mount assembly base plate 126 by a flexure attachment 140. The flexure attachment may include, e.g., a first beam 142, which may be relatively thin, e.g., _ mm in width and of the same height as the mount assembly base plate 126, and a second beam 144 similar to the first beam 142, and intersecting the first beam 142 at a beam intersection 146.

Figure 3:
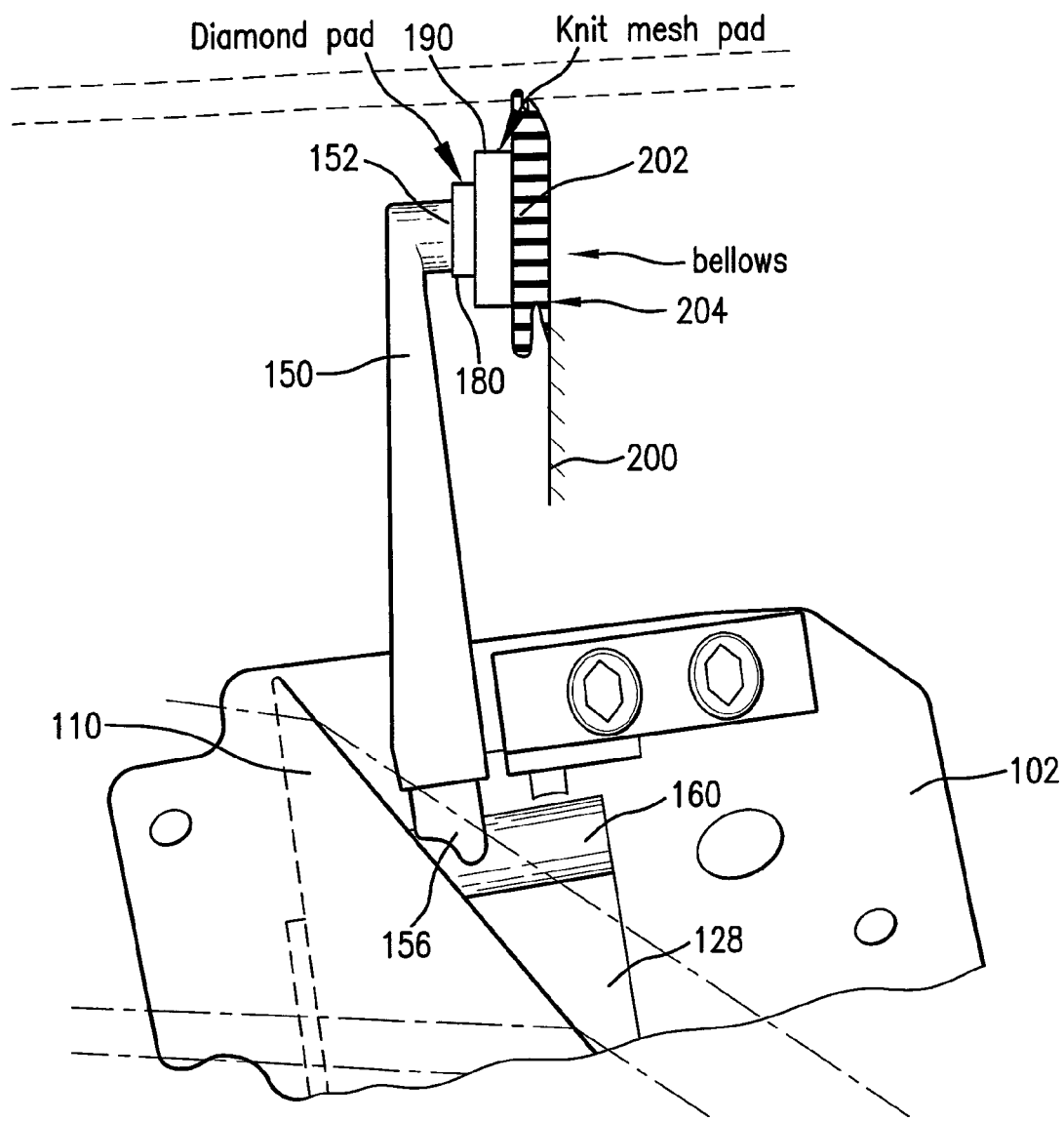
FIG. 3 illustrates partly schematically a center wavelength selection line narrowing module according to aspects of an embodiment of the disclosed subject matter.
Figure 7:
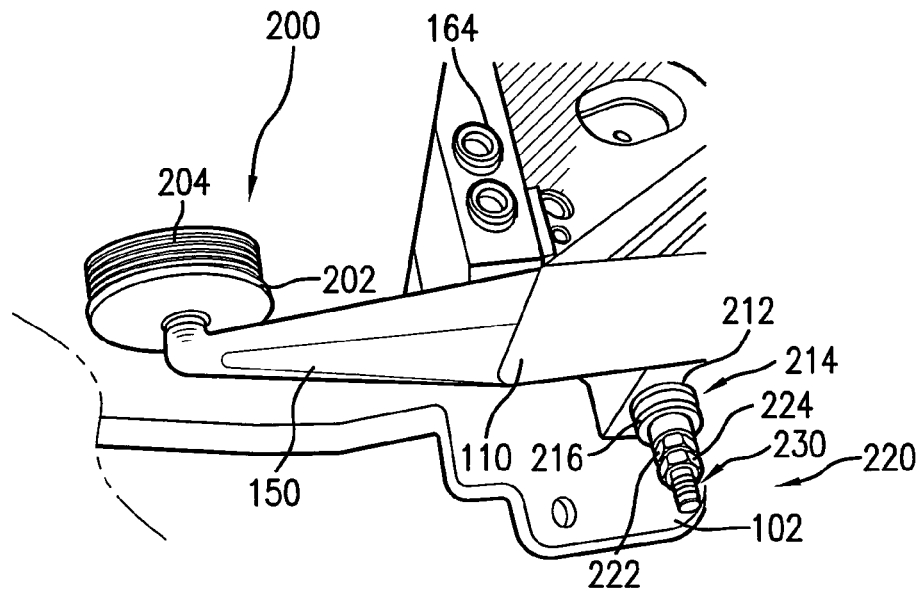
FIG. 7 illustrates in perspective view elements of the damping mechanism of FIG. 6.

FIGS. 1A, 3 and 7 illustrate a prism rotation drive mechanism which may include, e.g., a prism rotational drive lever arm 150, including a drive lever arm drive pin 152. The prism rotational drive lever arm 150 may pivot about a fulcrum 154 to actuate the prism drive rotation drive actuator arm 156. The fulcrum 154 may be positioned on the lever arm 150 adjacent a fulcrum pin 158 contained on a fulcrum plate 159, which may be mounted on a fulcrum pin mounting bracket 164 by a fulcrum plate attachment screw 162. The drive actuator arm 156 may engage a prism plate drive member 160 attached to the flexure mounted fourth prism mounting plate 128 causing the fourth prism 110 to rotate about the pivot point formed at the intersection 146 of the flexure beams 142, 144.

Damping may be achieved according to aspects of an embodiment of the disclosed subject matter by, e.g., putting a polished hard pad 180 and a knit wire mesh pad 190 intermediate the lever arm drive pin 152 and the mirror rotation stepper motor actuator arm bellows end plate 202 as illustrated in FIGS. 3 and 7. The actuator arm (not shown) and the stepper motor (not shown) are sealed from the LNM internal housing environment by the bellows end plate 202 and the expandable portion of the bellows 204, such that, when the actuator arm (not shown) moves, the end plate interacts with the lever arm 150 to rotate the prism 110 on its mounting plate 128. In operation, the wire mesh pad 190 damps vibrations from outside of the LNM, which might enter into the system through the contact of the drive pin 152 with the end plate 202 or even, e.g., through the walls of the LNM. The polished hard pad, made, e.g., of diamond or steel may serve to spread the distribution of the force imparted by the drive pin 152 over a greater surface area of the damping pad 190, which increases it effectiveness by distributing the region of wire mesh subject to elastic deformation and recoil that will produce the damping spring effect of the damping pad 190. The hard pad also allows for the pin 152 to be able to slide laterally relative to its normal position vis-a-vis the bellows end plate 202, which may be difficult with direct contact with the knit wire mesh pad 190.

Figure 6:
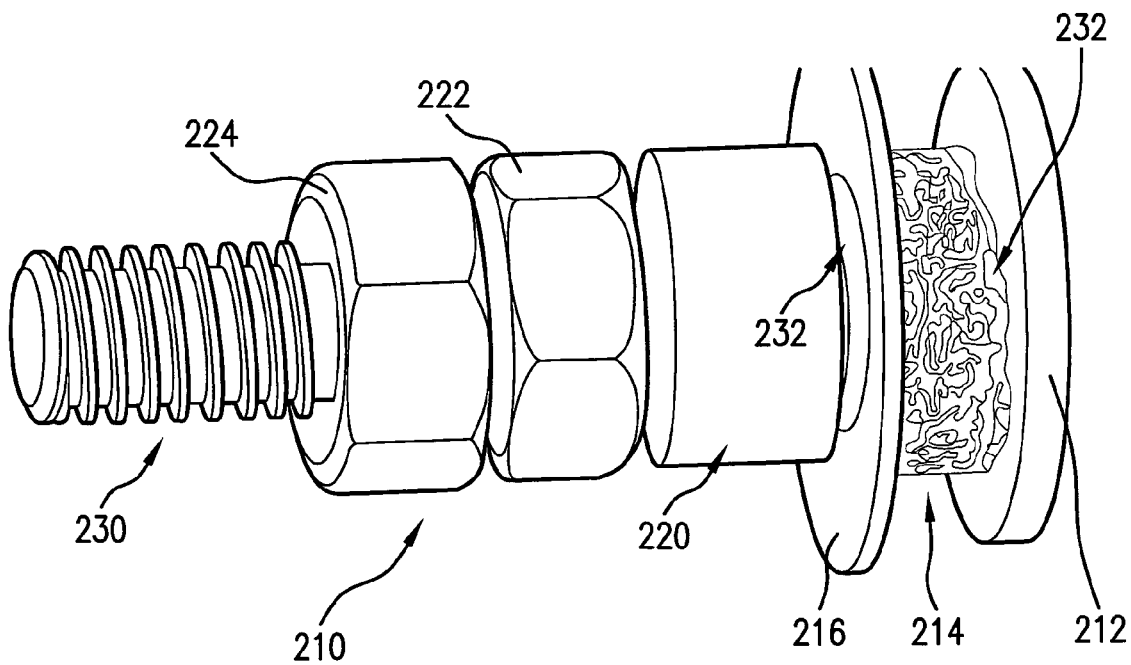
FIG. 6 illustrates a mass damping mechanism according to aspects of an embodiment of the disclosed subject matter.

Turning now to FIG. 6 there is illustrated a prototype of a mass damper 210 according to aspects of an embodiment of the disclosed subject matter. The mass damper may include, e.g., a mounting damper plate 212 and a wire knit mesh damping element, e.g., a disc 214 sandwiched between the mass damper mounting plate and a damping mass mounting plate 216. the damping mass mounting plate may have attached to it a damping mass, e.g., a bolt 220 with possibly additional mass(es), e.g., a nut 222 and a further additional mass provided by a nut 224, each of which may be attached to the threads 230 of the bolt 220. While epoxy is possibly not a good material for utilization for attachments within an LNM for a DUV light source, since, among other things it may be exposed to stray DUV light and thus deteriorate like, e.g., Viton or other elastomers, and may also outgas if not specifically manufactured to avoid such outgassing, for purposes of this prototype epoxy 232, e.g., 3M 2216 epoxy, as illustrated, was used to assemble the bolt 220 to the plate 216 and the wire mesh disk 214 to the plates 212 and 214. Those skilled in the art will understand that other means of attachment may be possible, e.g., welding or soldering or use of epoxy with appropriate manufacturing specifications as noted and appropriate shielding from stray DUV light in this environment.

Figure 2:
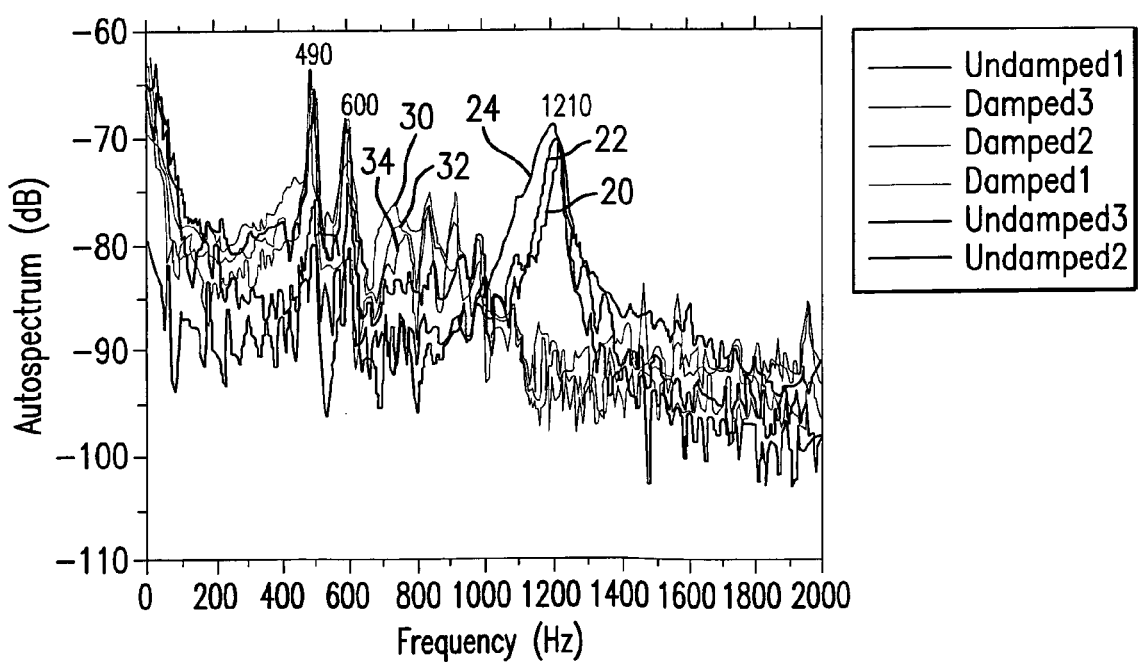
FIG. 2 illustrates the impact of damping of an optical element in the line narrowing module according to aspects of an embodiment of the disclosed subject matter.

FIG. 2 illustrates a representative and illustrative vibration spectrum for a line narrowing module mirror mount flexure mounting such as illustrated in FIGS. 1A, 1B, 3 and 7 with and without a knit mesh damper using, e.g., in the case of the presence of a damper a mesh pad 75% free volume, 1 cm diameter, 3 mm thick stainless steel wire damping pad supplied by Knitmesh Technologies, e.g., with the pad inserted between lever arm and bellows. The darker curves 20, 22, 24 illustrate sample runs of impact excitation on the flexure, e.g., with all optomechanical components in place as used in the laser. This illustrates a potentially problematical at about 1200 Hz resonance peak, which as illustrated can be essentially completely damped using the damping technique illustrated by way of example in FIG. 3.

Figure 4:
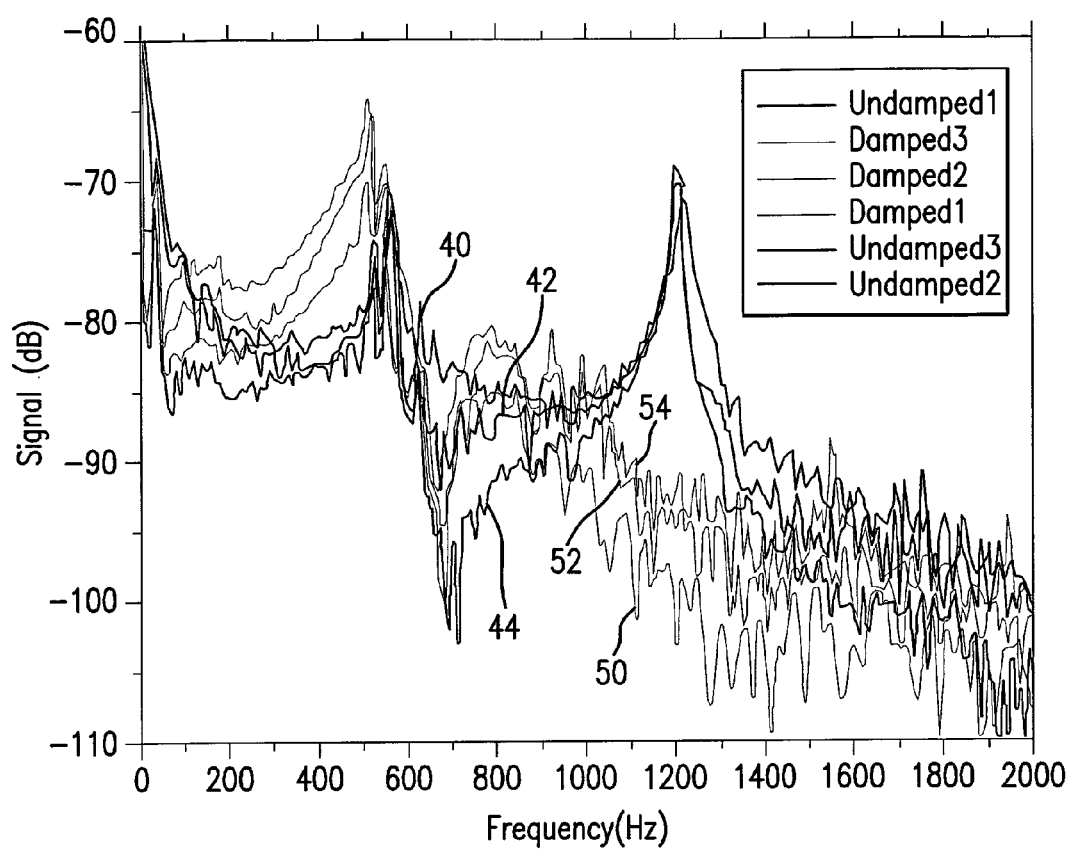
FIG. 4 illustrates the impact of damping of an optical element in the line narrowing module according to aspects of an embodiment of the disclosed subject matter.

FIG. 4 illustrates another example of damping effect showing again a significant effect in damping the peak at about 1200 Hz. Lever arm tip 152 must be able to slide laterally, which may be effected by adding diamond pad 154 on top of knit mesh damper. As illustrated in FIG. 4 there is still a significant damping of the 1200 HzResonance, shown in the darker (undamped) curves 40, 42 and 44, as illustrated by the lighter curves 50, 52, 54.

Figure 5:
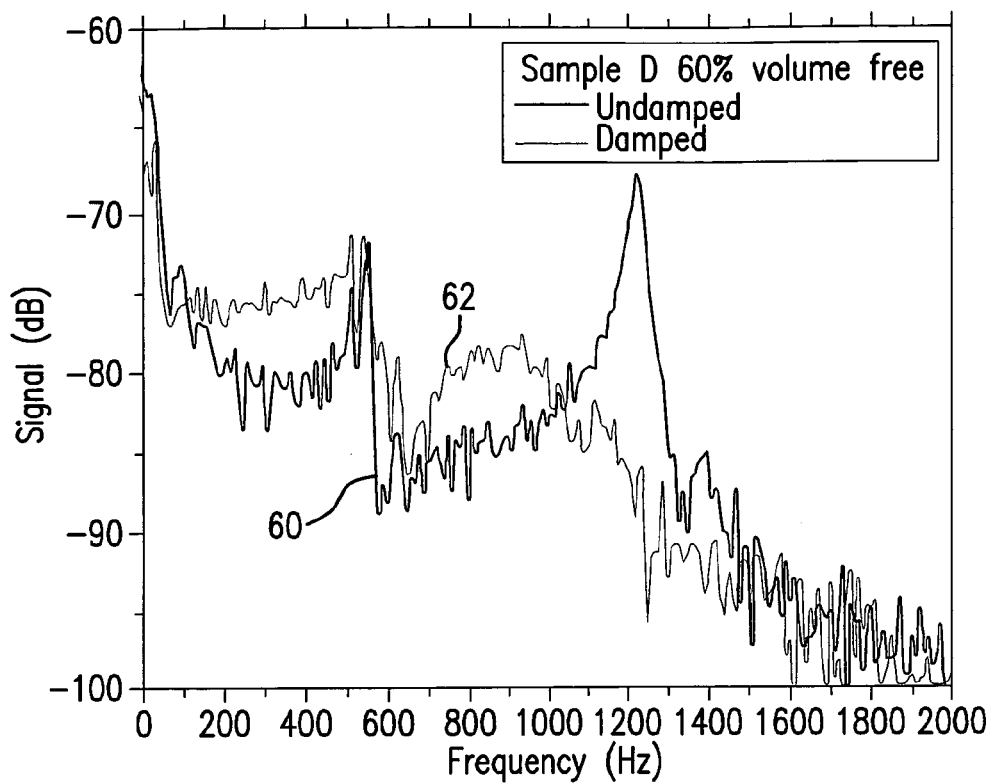
FIG. 5 illustrates the impact of damping of an optical element according to aspects of an embodiment of the disclosed subject matter.

FIG. 5 illustrates an example of a vibration spectrum for flexure with\without knit mesh damper using the most dense knit mesh pad available (60% free volume), 1 cm diameter, 3 mm thick. These pads are noticeably much more stiff. The undamped data is taken with a solid flat plate to simulate the thickness of the knit mesh pad. Even at this high density the attenuation at the 1200 pulse per second resonance peak is evident, as illustrated in lighter curve 62 as compared to darker curve (undamped) 60.

A consideration when using the knit mesh pad 190 between the lever arm 152 and bellows end plate 202 is that there may be some deviation from linearity at initial loads in the microsteps vs. center wavelength selected, e.g., due to deformation of the knit wire pad. However, by going to the most dense/stiff mesh possible (which still provides damping), this can be minimized. As shown in FIG. 5, even the highest density sample obtained (60% free volume) had good damping performance. Furthermore, this approach is a broadband damper, in contrast to a tuned mass damper, such as discussed elsewhere in the present application.

A less stiff/softer elastic damping pad could also be used, either along with a protective contact plate (hard pad), such as the contact plate described above, or one could allow the pad, such as pad 190, to be deformed in an initial set up or in manufacture, e.g., by a lever arm tip 152 discussed above after which the surrounding portions of the lever arm driving member from which the tip 152 protrudes may prevent further deformation of the pad, and/or the pad may be permanently deformed to a maximum extent by the tip 152 and further pressure applied, e.g., by the lever arm tip 152 may then serve only to elastically deform the pad 190.

Figure 10:
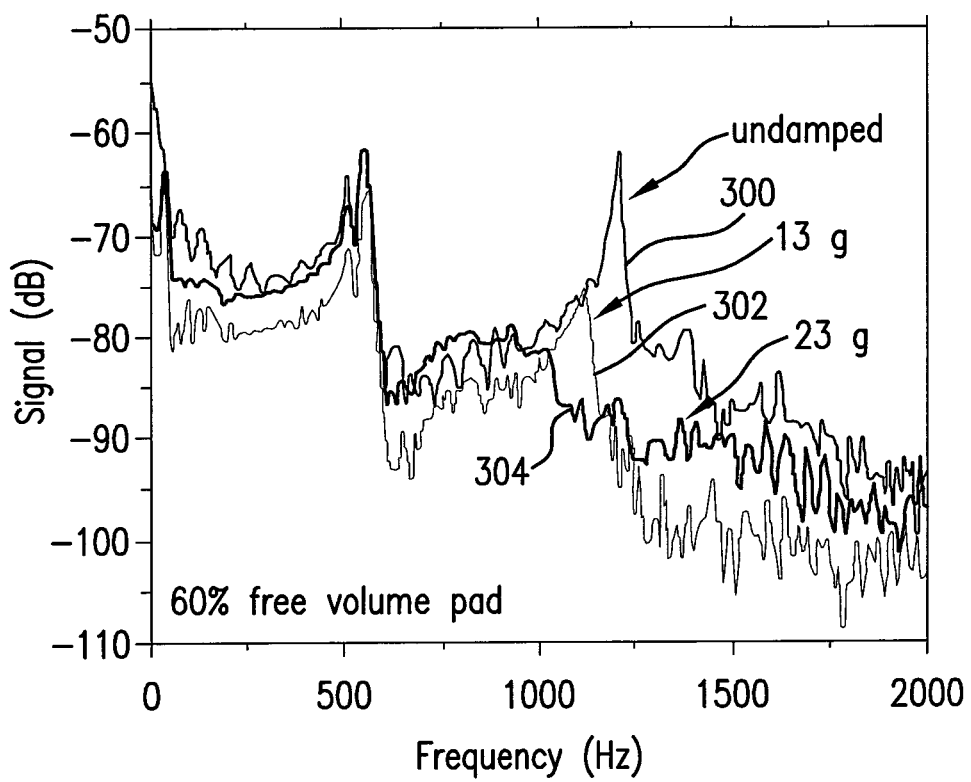
FIG. 10 illustrates, by way of example, the modification of the frequency response, e.g., for a prism mount, with a mass damper using a 13 gram damping mass (curve 302) or a 23 gram damping mass (curve 304) as compared to an undamped curve 300.
Figure 11:
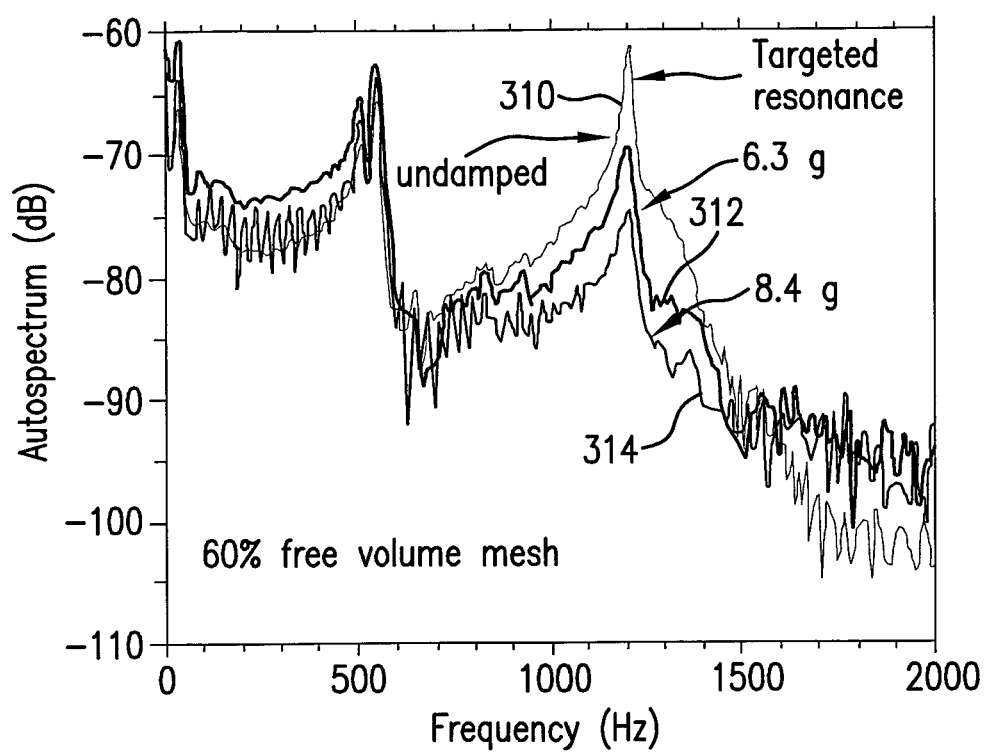
FIG. 11 illustrates, by way of example, another undamped curve 310 and curves resulting from using a 6.3 gram damping mass (curve 312) or an 8.4 gram damping mass (curve 314)
Figure 12:
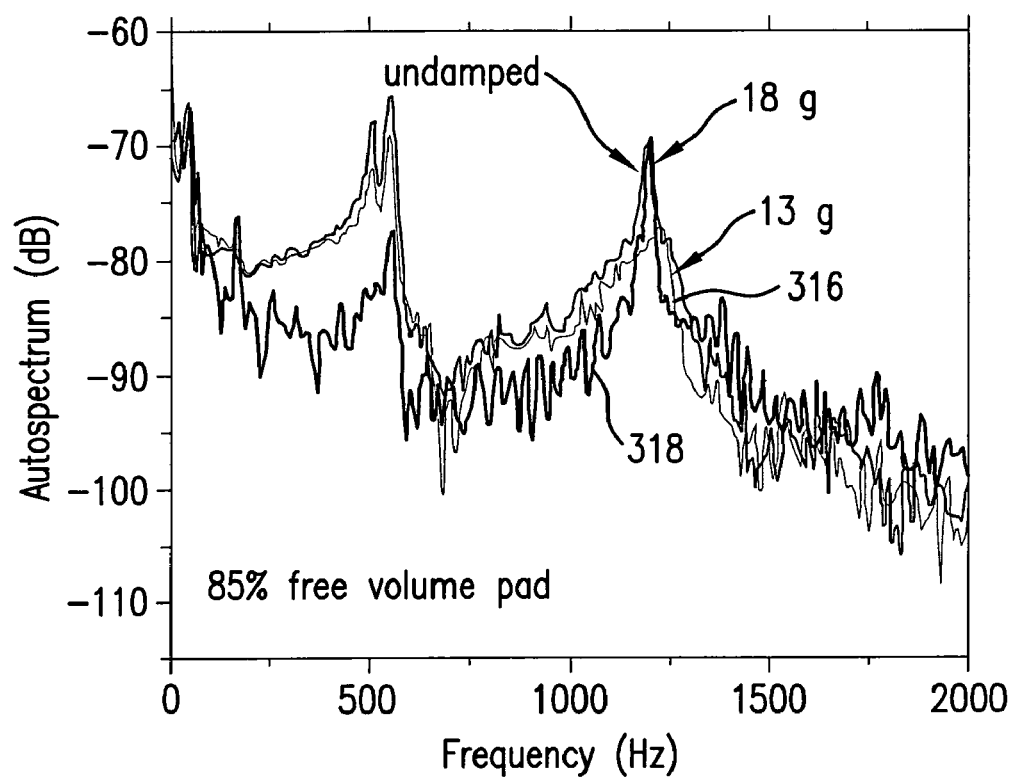
FIG. 12 illustrates the use of an 85% free volume mesh, which is relatively less stiff and more elastic than the 60% free volume mesh, but as seen, is also relatively less able to dampen out the resonance peak at around 1200 Hz than the 60% free volume mesh.
Figure 14:
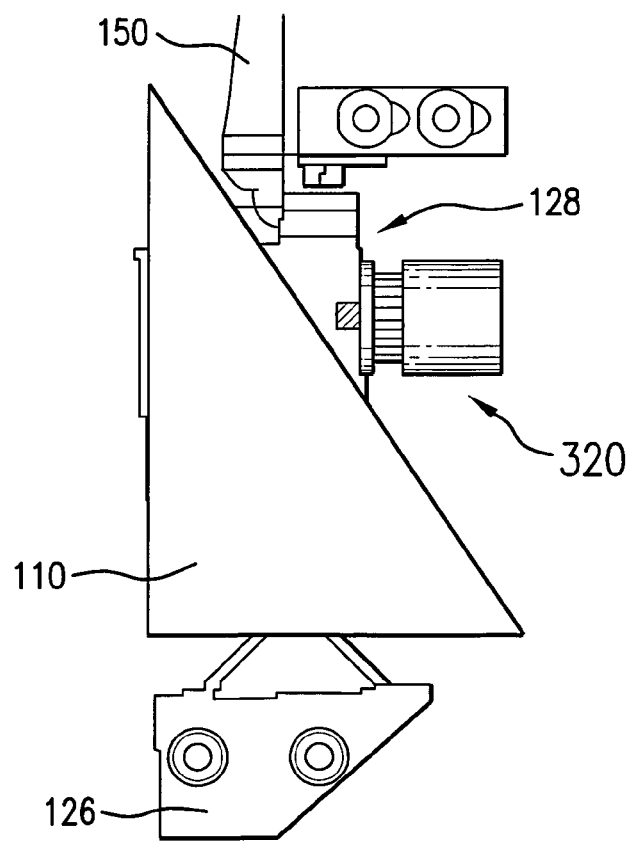
FIG. 14 illustrates the attachment of a mass damper to a flexure mounting like that of FIGS. 1A and 1B.

Turning now to FIG. 7, there is shown an illustrative example of a tuned mass damper 220, such as illustrated in more detail in FIG. 6, attached by suitable means, e.g., welding or soldering the end plate 212 onto a movable portion of an optical element mount, e.g., prism mounting plate flexure 128. Such an arrangement may be in lieu of the arrangement shown in FIG. 3, as illustrated by way of example in FIG. 9, or in addition to the arrangement shown in FIG. 3. The masses, e.g., nuts, may be adjusted in size and therefore also in weight, to the weight, stiffness, etc. of the mounting plate 128. Applicant has done some experimenting with suitable masses for mass dampers, with results illustrated in the data discussed elsewhere in the present application and also as shown, e.g., in FIG. 10. FIG. 10 illustrates by way of example the modification of the frequency response, e.g., for a prism mount, e.g., as illustrated in FIGS. 1A, 1B or 14 and with a mass damper, e.g., of the prototype type shown in FIG. 6 or the illustrative example of FIG. 14, and, e.g., using a 13 gram damping mass (curve 302) or a 23 gram damping mass (curve 304) as compared to an undamped curve 300. Similarly in FIG. 11 there is illustrated by way of example another undamped curve 310 and curves resulting from using a 6.3 gram damping mass (curve 312) or an 8.4 gram damping mass (curve 314). These FIGS. 10 and 11 illustrate the use of a wire mesh pad, e.g., as supplied by Knitmesh technologies referenced above, with a 60% free volume mesh. Similarly FIG. 12 illustrates the use of an 85% free volume mesh, which is relatively less stiff and more elastic than the 60% free volume mesh, but as seen, is also relatively less able to dampen out the resonance peak at around 1200 Hz than the 60% free volume mesh, even with smaller masses such as shown in FIG. 10, i.e., a 13 gram damping mass (curve 316) and an 18 gram damping mass (curve 318). It will be understood that these curves are illustrative only of how one skilled in the art can select the particular damping mass, depending upon the mass damper selected, the mass selected, its placement relative to the element to be vibration damped, etc.

Figure 13:
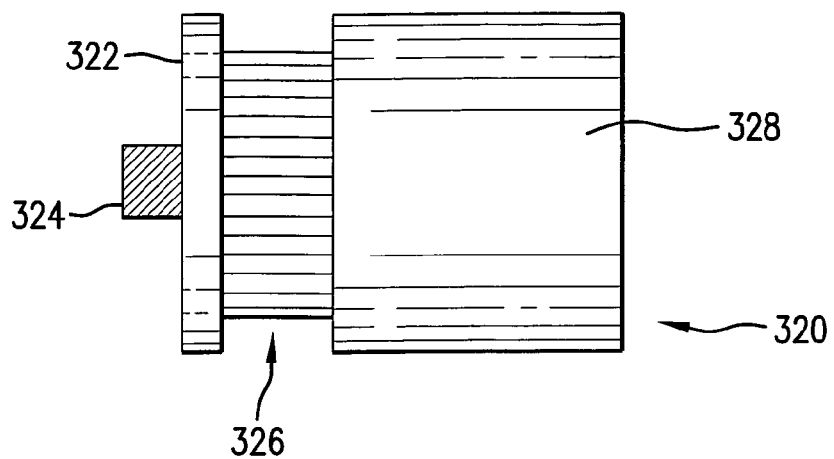
FIG. 13 illustrates, by way of example, another type of mass damper which may comprise a mounting plate, a positioning protrusion, a mesh pad and a damping mass.

FIG. 13 illustrates by way of example another more refined type of mass damper 320, which may comprise, e.g., a mounting plate 322, a positioning protrusion 324 (threaded, e.g., so as to be thereby attached to the flexure wall or other structure to be damped), a mesh pad 326 and a damping mass 328, e.g., a cylindrical body attached by suitable means, e.g., by welding or soldering to the mesh pad. FIG. 14 illustrates the attachment of a mass damper 320 to a flexure mounting like that of FIGS. 1A and 1B.

Applicant believes that a preferred wire mesh pad density for this application discussed above and given the variables discussed above for use as illustrated in FIG. 14 should utilize a mesh pad, e.g., of the kind supplied by Knitmesh Technologies, in the range of between about 60% and 80% free volume, e.g., above 60% and, e.g., further in a range of 60%-70% or 60%-80%, with a preferred tune damper mass of between about 10-100 grams, e.g., above 10 grams and in a range of 10 grams-20 grams, or 10 grams-50 grams or 10 grams-80 grams or 20 grams-50 grams or 20 grams-80 grams. It is believed that such pads with less than 60% free volume are too rigid for the desired range of masses (e.g., 10-100 g) and pads with more than 80% free volume deform easily and permanently, losing shape. However, it is also believed that other geometries and sizes for optical elements and/or their mountings may call for larger masses for the damping mass and thus other percentages of free volume or other materials than steel may be more appropriate or equally as appropriate for the application. Similar experiment and analysis for the size, type, material and/or percentage of free volume, or for that matter, other measures of the performance of such a mesh pad for vibration damping and the like, for a mesh pad and the damping mass may be utilized in the applications illustrated in FIG. 8 as well as for a mesh pad for the applications illustrated in FIGS. 3, 7, 9 and/or 14. As illustrated by way of example, the positioning protrusion may be utilized to attach the mass damper to the element being damped, e.g., the flexured mounting 128.

Figure 8:
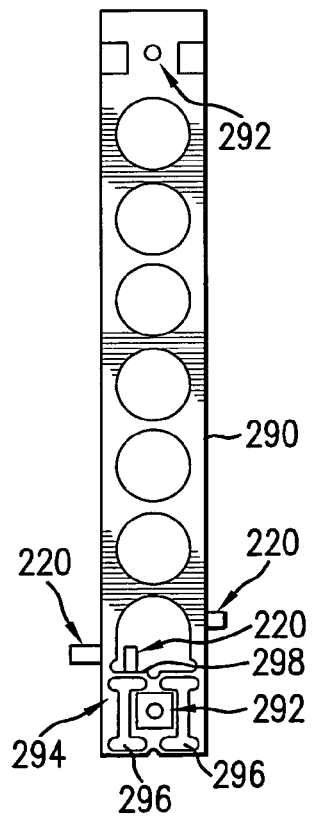
FIG. 8 illustrates, partly schematically a damping mechanism according to aspects of an embodiment of the disclosed subject matter; and, FIG. 9 illustrates, partly schematically a damping mechanism according to aspects of an embodiment of the disclosed subject matter.

FIG. 8 shows, partly schematically, mass damper 220, such as are illustrated in FIG. 3, e.g., used with an optical mounting plate, e.g., a mounting plate 290 for a line narrowing module grating. The grating may be attached to the floor of a housing for the LNM by, e.g., epoxy (not shown) and have the grating attached to the mounting plate 290, e.g., by epoxy placed, e.g., at the epoxy droplet points 292, one of which may be on a flexured portion 294 of the mounting plate 290. The flexure mount 294 may be formed by cutting "I" shaped ("dog biscuit" shaped) openings 296 through the material of the mounting plate 290, the mounting plate 290 material may be a very lo coefficient of thermal expansion glass, e.g., Invar. As illustrated, such openings for thin flexure arms 298, which give the mounting of the grating some flexibility in the longitudinal axis of the mounting plate 290. The mass dampers 220 may be positioned on either side of the longitudinal side walls of the mounting plate or on one or move of the thin flexure arms 298.

Figure 9:
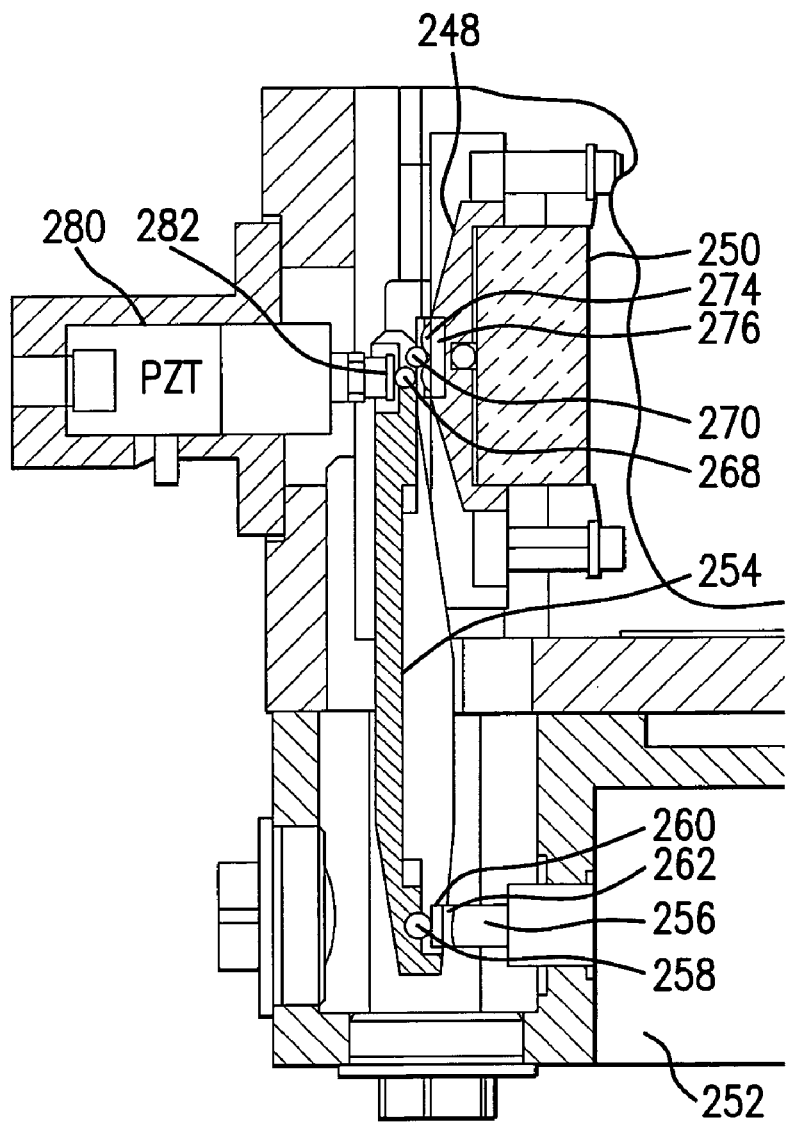

FIG. 9 illustrates, partly schematically, and by way of illustration yet another example of an application of an embodiment of the disclosed subject matter, e.g., on a wavelength selection optical element maximum reflection mirror ("$R_{MAX}$") mount, as such an $R_{MAX}$ mount is known in the art, e.g., as reflected in U.S. Pat. No. 6,567,450, in FIG. 16B1 and accompanying text, a modified version of such FIG. being FIG. 9 of the present application. In FIG. 9 there is illustrated by way of example an $R_{MAX}$ 250 mounted on a mount 248 that is pivotable around an angle of incidence selection pivot axis generally parallel to the plane of the paper and/or tiltable about a tilt axis generally perpendicular to the plane of the paper. The $R_{MAX_V}$ mount 248 may be pivoted by using a combination of a stepper motor 252, in combination with a pivoting lever arm 254 (for slower and coarse adjustment of the angle of incidence of the light beam on the LNM grating) and an electrically or magnetically actuated positioner, e.g., a piezoelectric actuator 280 (for faster and fine adjustment).

The lever arm 254 may be driven at one end by a stepper motor actuator shaft 256, which may be interfaced with the lever arm 254 by a drive ball 258 and a vibration isolation element according to aspects of an embodiment of the disclosed subject matter, which may be formed by a wire mesh pad 262, along with, by way of example, also a harder protective plate, e.g., a diamond plate 260, similar to that illustrated schematically in FIG. 3. At the other end of the lever arm 254 may be a fulcrum 268 and a pivoting drive ball 270, which may be driven by the lever arm 254 and/or the piezoelectric element 280 to pivot the $R_{MAX}$ mount 248. The pivot ball 270 may be interfaced to the $R_{MAX}$ mount 248 by an arrangement including, by way of example, according to aspects of an embodiment of the disclosed subject matter a wire mesh pad/disc 276 and a harder protective contact plate 274, similar to that shown schematically in FIG. 3 and at the other end of the lever arm in FIG. 9, with, e.g., an added ball receiving groove.

It will be understood by those skilled in the art that a method and apparatus is disclosed that may comprise an ultraviolet light source, e.g., a pulsed gas discharge laser system, such as an excimer or molecular fluorine DUV light source; an optical element within an optical path of the light source, e.g., for center wavelength selection, e.g., by modifying an angle of incidence of a beam of laser light in a line narrowing module onto a dispersive optical element, mounted on an optical element mount; a vibration damping mechanism operatively connected to the optical element or to the mount comprising a wire mesh pad. The optical element may comprise a center wavelength selection optical element, which may comprise a grating, a mirror, or a prism, alone or in combination serving to, e.g., select a center wavelength. The vibration damping mechanism may comprise the wire mesh pad which may comprise an elastic interface between a driving mechanism operable to move the optical element or the mount and a driving mechanism arm actuator. The vibration damping mechanism may comprise a mass damping mechanism comprising a mounting plate connected to the optical element or to the mount; a damping mass; the metal wire mesh pad comprising an elastic interface between the mounting plate and the damping mass, which may be metal or some other suitable material such as plastic possessing enough rigidity like metal wire and a the same time when formed into the mesh pad as described in the present application having enough elasticity to comprise an elastic damping material and thus a vibration absorber such as the wire mesh pads made by Knitmesh Technologies referenced above and to act as an interface between an actuator and an actuated optical element and/or mount or an interface between a mounting member and a mass or masses in a mass damper. The apparatus and method may comprise an ultraviolet light source; a line narrowing module which may comprise: a center wavelength selection optical element, e.g., a dispersive grating and/or an angle of incidence selection element, e.g., a mirror ($R_{MAX}$) or one or more prisms, within the line narrowing module mounted on an optical element mount (e.g., respectively for the grating, mirror and/or prism(s); a vibration damping mechanism operatively connected to the optical element or to the mount comprising a wire mesh pad. The method and apparatus may comprise a DUV laser light source; a line narrowing module which may comprise a dispersive center wavelength selection optical element within the line narrowing module mounted on a center wavelength selection optical element mount; an angle of incidence selection optical element within the line narrowing module mounted on an angle of incidence selection optical element mount; a vibration damping mechanism operatively connected to the center wavelength selection optical element or to the center wavelength selection optical element mount or to the angle of incidence optical element or to the angle of incidence optical element mount, which may comprise a wire mesh pad. The center wavelength selection optical element may comprise a grating. The angle of incidence selection optical element may comprise a mirror or a prism. The angle of incidence selection optical element mount may comprise a flexure element. The center wavelength selection optical element mount may comprise a flexure element.

It will be understood by those skilled in the art that the aspects of embodiments of the disclosed subject matter are intended to be possible embodiments or portions of possible embodiments only and not to limit the disclosure of the disclosed subject matter in any way and particularly not to a specific possible embodiment or portion of a possible embodiment alone. Many changes and modification can be made to the disclosed aspects of embodiments of the disclosed subject matter that will be understood and appreciated by those skilled in the art. The appended claims are intended in scope and meaning to cover not only the disclosed aspects of embodiments of the disclosed subject matter but also such equivalents and other modifications and changes that would be or become apparent to those skilled in the art. In addition to changes and modifications to the disclosed and claimed aspects of embodiments of the disclosed subject matter others could be implemented. Buy way of example, a given optical element or its mount may employ more than one of the above described vibration dampers, including more than one wire mesh pad and/or more than one mass damper and/or both one or more actuator damper pads and one or more mass dampers. As an example, an optical element may have more than one mass damper, e.g., each tuned to a different frequency.

While the particular aspects of the embodiment(s) of the METHOD AND APPARATUS FOR VIBRATION REDUCTION IN LASER SYSTEM LINE NARROWING UNIT WAVELENGTH SELECTION OPTICAL ELEMENT described and illustrated in this patent application in the detail required to satisfy 35 U.S.C. §112 are fully capable of attaining any above-described purposes for, problems to be solved by, or any other reasons for or objects of the aspects of an embodiment(s) above described, it is to be understood by those skilled in the art that presently described aspects of the described embodiment(s) of the disclosed subject matter are merely exemplary, illustrative and representative of the subject matter which is broadly contemplated by the disclosed subject matter. The scope of the presently described and claimed aspects of embodiments or portions of embodiments fully encompasses other embodiments or portions of embodiments which may now be or may become obvious to those skilled in the art based on the teachings of the Specification. The scope of the present METHOD AND APPARATUS FOR VIBRATION REDUCTION IN LASER SYSTEM LINE NARROWING UNIT WAVELENGTH SELECTION OPTICAL ELEMENT is solely and completely limited by only the appended claims and nothing beyond the recitations of the appended claims. Reference to an element in any such claim in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the Specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment or portion of an embodiment to address each and every problem sought to be solved by the aspects of embodiments or portions of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood also be those skilled in the art that, in fulfillment of the patent statutes of the United States, Applicant(s) has disclosed at least one enabling and working embodiment of each invention recited in any respective claim appended to the Specification in the present application and perhaps in some cases only one. For purposes of cutting down on patent application length and drafting time and making the present patent application more readable to the inventor(s) and others, Applicant(s) has used from time to time or throughout the present application definitive verbs (e.g., "is", "are", "does", "has", "includes" or the like) and/or other definitive verbs (e.g., "produces," "causes" "samples," "reads," "signals" or the like) and/or gerunds (e.g., "producing," "causing", "using," "taking," "keeping," "making," "sampling," "determining," "measuring," "calculating," "reading," "signaling," or the like), in defining an aspect/feature/element of, a step of, an action of or functionality of, and/or describing any other definition of an aspect/feature/element of or step of or action/functionality of, an embodiment or portion of an embodiment of a method or apparatus which is within the subject matter being disclosed. Wherever any such definitive word or phrase or the like is used to describe an aspect/feature/element of or step of or action or functionality of or the like of any of the one or more embodiments or portions of embodiments disclosed herein, e.g., any feature, element, system, sub-system, component, sub-component, process or algorithm step, particular material, or the like, it should be read, for purposes of interpreting the scope of the claimed subject matter of what applicant(s) has invented, and claimed in the appended claims, to be preceded by one or more, or all, of the following limiting phrases, "by way of example," "for example," "as an example," "illustratively only," "by way of illustration only," etc., and/or to include any one or more, or all, of the phrases "may be," "can be", "might be," "could be" and the like. All such aspects, features, elements, steps, materials, actions, functions and the like should be considered to be described only as a possible aspect of the one or more disclosed embodiments or portions of embodiments and not as the sole possible implementation of any one or more aspects/features/elements of or steps of or actions/functionalities of, or the like of, any embodiments or portions of embodiments and/or the sole possible embodiment of the subject matter of what is claimed, even if, in fulfillment of the requirements of the patent statutes, Applicant(s) has disclosed only a single enabling example of any such aspect/feature/element of or step of or action or functionality of, or the like of, an embodiment or portion of an embodiment of the subject matter of what is claimed. Unless expressly and specifically so stated in the present application or the prosecution of this application, that Applicant(s) believes that a particular aspect/feature/element or step of or action or functionality of, or the like of, any disclosed embodiment or any particular disclosed portion of an embodiment of the subject matter of what is claimed, amounts to the one an only way to implement the subject matter of what is claimed or any aspect/feature/element or step of or action/functionality or the like of the subject matter disclosed and recited in any such claim, Applicant(s) does not intend that any description of any disclosed aspect/feature/element or step of or action or functionality or the like of, any disclosed embodiment or portion of an embodiment of the subject matter of what is disclosed and claimed in the present patent application or the entire embodiment shall be interpreted to be such one and only way to implement the subject matter of what is disclosed and claimed or any aspect/feature/element or step of or action or functionality of or the like of such subject matter, and to thus limit any claim which is broad enough to cover any such disclosed implementation along with other possible implementations of the subject matter of what is claimed, to such disclosed aspect/feature/element or step of or action/functionality of or the like of such disclosed embodiment or any portion of such embodiment or to the entirety of such disclosed embodiment. Applicant(s) specifically, expressly and unequivocally intends that any claim that has depending from it a dependent claim with any further detail of any aspect/feature/element, step, action, functionality or the like of the subject matter of what is recited in the parent claim or claims from which it directly or indirectly depends, shall be interpreted to mean that the recitation in the parent claim(s) was broad enough to cover the further detail in the dependent claim along with other possible implementations and that the further detail was not the only way to implement the aspect/feature/element claimed in any such parent claim(s), and thus that the parent claim be limited to the further detail of any such aspect/feature/element, or step, or action/functionality, or the like, recited in any such dependent claim to in any way limit the scope of the broader aspect/feature/element or step or action/functionality or the like of any such parent claim, including by incorporating the further detail of the dependent claim into the parent claim.

I claim:

1. An apparatus comprising:
an ultraviolet light source;
an optical element within an optical path of the light source mounted on an optical element mount;
a vibration damping mechanism operatively connected to the optical element or to the mount, comprising a wire mesh pad.

2. The apparatus of claim 1 further comprising:
the optical element comprising a center wavelength selection optical element.

3. The apparatus of claim 2 further comprising:
the selection optical element comprising a grating.

4. The apparatus of claim 2 further comprising:
the selection optical element comprising a mirror.

5. The apparatus of claim 2 further comprising:
the selection optical element comprising a prism.

6. The apparatus of claim 1 further comprising:
the vibration damping mechanism comprising:
the wire mesh pad comprising an elastic interface between a driving mechanism operable to move the optical element or the mount and a driving mechanism actuator.

7. The apparatus of claim 1 further comprising:
the vibration damping mechanism comprising:
a tuned mass damping mechanism comprising a mounting plate connected to the optical element or to the mount;
a damping mass;
the wire mesh pad comprising an elastic interface between the mounting plate and the damping mass.

8. An apparatus comprising:
an ultraviolet light source;
a line narrowing module comprising:
a center wavelength selection optical element within the line narrowing module mounted on an optical element mount;
a vibration damping mechanism operatively connected to the optical element or to the mount, comprising a wire mesh pad.

9. The apparatus of claim 8 further comprising:
the selection optical element comprising a grating.

10. The apparatus of claim 8 further comprising:
the selection optical element comprising a mirror.

11. The apparatus of claim 8 further comprising:
the selection optical element comprising a prism.

12. The apparatus of claim 8 further comprising:
the vibration damping mechanism comprising:
the wire mesh pad comprising an elastic interface between a driving mechanism lever arm operable to move the optical element or the mount and a driving mechanism lever arm actuator.

13. The apparatus of claim 8 further comprising:
the vibration damping mechanism comprising:
a mass damping mechanism comprising a mounting plate connected to the optical element or to the mount;
a damping mass;
the wire mesh pad comprising an elastic interface between the mounting plate and the damping mass.

14. An apparatus comprising:
a DUV laser light source;
a line narrowing module comprising:
a dispersive center wavelength selection optical element within the line narrowing module mounted on a center wavelength selection optical element mount;
an angle of incidence selection optical element within the line narrowing module mounted on an angle of incidence selection optical element mount;
a vibration damping mechanism operatively connected to the center wavelength selection optical element or to the center wavelength selection optical element mount or to the angle of incidence optical element or to the angle of incidence optical element mount, comprising a wire mesh pad.

15. The apparatus of claim 14 further comprising:
the center wavelength selection optical element comprising a grating.

16. The apparatus of claim 14 further comprising:
the angle of incidence selection optical element comprising a mirror.

17. The apparatus of claim 14 further comprising:
the angle of incidence selection optical element comprising a prism.

18. The apparatus of claim 14 further comprising:
the vibration damping mechanism comprising:
the wire mesh pad comprising an elastic interface between a driving mechanism operable to move the optical element or the mount and a driving mechanism arm actuator.

19. The apparatus of claim 14 further comprising:
the vibration damping mechanism comprising:
a mass damping mechanism comprising a mounting plate connected to the optical element or to the mount;
a damping mass;
the wire mesh pad comprising an elastic interface between the mounting plate and the damping mass.

20. The apparatus of claim 14 further comprising:
the angle of incidence selection optical element mount comprising a flexure element.

21. The apparatus of claim 14 further comprising:
the center wavelength selection optical element mount comprising a flexure element.

22. A method comprising:
utilizing an ultraviolet light source comprising an optical element within an optical path of the light source mounted on an optical element mount;
damping vibration in the optical element utilizing a damping mechanism operatively connected to the optical element or to the mount, comprising a wire mesh pad.

23. A method comprising:
utilizing a DUV laser light source comprising a line narrowing module comprising:
a dispersive center wavelength selection optical element within the line narrowing module mounted on a center wavelength selection optical element mount;
an angle of incidence selection optical element within the line narrowing module mounted on an angle of incidence selection optical element mount;
damping vibration in either or both of the center wavelength selection optical element or the angle of incidence selection optical element utilizing a damping mechanism operatively connected to the center wavelength selection optical element or to the center wavelength selection optical element mount or to the angle of incidence optical element or to the angle of incidence optical element mount, comprising a wire mesh pad.

24. A method comprising:
utilizing a wire mesh pad for vibration damping of an optical element in a line narrowing module for a DUV laser light source.

* * * * *